Patented Mar. 2, 1937

2,072,748

UNITED STATES PATENT OFFICE 2,072,748

PROCESS OF MAKING BAKER-YEAST FROM BEER-YEAST

Edmund Fuchs, Mihalovce, Czechoslovakia

No Drawing. Application November 14, 1934, Serial No. 753,065

8 Claims. (Cl. 195—97)

My invention relates to improvements in and relating to processes of making baker-yeast from beer-yeast.

It is well known that in the course of the brewing of beer there is formed, as a byproduct of the mash fermentation, a lot of beer-yeast, which hitherto could not be utilized.

Attempts have been made to use beer-yeast in the baking trade, but no one of the known processes has turned out well. This may be the reason for the general view even in scientific circles that it is impossible to make baker-yeast from beer-yeast.

By a thorough investigation of the properties of beer-yeast and making use of the knowledge, collected with regard to the general habits of yeast, it will, however, be evident that there is a possibility of making from beer-yeast an eminently suitable baker-yeast. Since the outlay in working costs will be repaid by the increased value of the baker-yeast produced, the process is a very profitable one.

An examination of the pressed beer-yeast with the microscope proves that this product consists of a mass of milliards of living and dead cells intertwined one into the other; the mass being easily spoiled even at ordinary temperatures. An investigation into the reason for this spoiling will show that beer-yeast is not able to withstand the higher temperatures prevailing in the rising of dough, because it has been cultivated in the course of the brewing of beer throughout generations at very low temperatures. In higher temperature-zones the decomposition of dead cells begins rapidly and the living cells, being pressed closely against the dead cells, which are going into decay, will be destroyed in an extremely short time, by the decomposition-products.

Attempts to bake with beer-yeast prove that at low temperatures, at which very active cells are present, beer-yeast is suitable, and what is more, it ferments more strongly than distillery-yeast. This activity, however, weakens proportionally and even ceases with the gradual rising of temperature, the dough remaining unfermented and the bread flat, its taste strange, often even disgusting, as the decomposition products of the beer-yeast are not able, in the absence of the development of carbonic acid, to leave the dough.

If, therefore, it is desired to make baker-yeast from beer-yeast, two problems must be solved, i. e.:

(1) The beer-yeast must be accustomed to the higher temperatures, prevailing in the fermentation of the dough.

(2) The dead cells must be eliminated from the original beer-yeast as well, as from the cells obtained in the course of the acclimatization.

As to (1) I have solved the problem of acclimatization of beer-yeast by using it to ferment mashes set at gradually increasing temperatures. The weaker cells are then destroyed immediately at the unaccustomed high temperature; the exceedingly vigorous cells, however, will rapidly become accustomed to the gradually raised higher temperature and begin to multiply. To effect acclimatization I carry out these fermentations in a series of mashes varying from a temperature of approximately 41° F. in the first mash to approximately 95° F. in the last mash.

As to (2) a mechanical device for separating the closely intertwined mass of the millions of dead cells from the legion of living cells is inconceivable. It would be useless to solve the problem referred to under (1) alone, although it is possible to bake with a beer-yeast accustomed to the higher temperatures, since not only is success entirely problematical, but also the taste of the dough is not perfect, because of the presence of a lot of dead cells among the living ones, this is the reason that ability of the beer-yeast acclimatized according to (1) to keep is often worse than that of the original yeast.

There is a rule regulating the essential conditions of life of the yeast-species which I have used in solving this problem. Yeast needs, as is known, foodstuffs comprising nitrogen for building up the structure of descendants, for when the yeast has consumed the nitrogen-foodstuffs offered in the raw material of the mashes, fermentation and propagation of the yeast ceases even when there is still plenty of sugar present.

I have observed that under the compelling effect of this rule of propagation, the living yeast takes nitrogen foodstuffs even from the dead cells, provided that it does not find other nitrogen-foodstuff and I base on this observation the theory that the dead cells may be eliminated by aid of the living ones. My tests have clearly confirmed that the living cells accomplish this cleaning process, provided that the fermentation is accomplished in very weak mashes containing at the most 2% of sugar under strong aeration, and to which no nitrogenous yeast-foodstuff is added.

I determine the times of the stages of fermentation so that the period of the low temperature stages up to 66° F. is at least twice the period of the fermentation stages over 66° F.

When examination of samples shows that the mash contains exceedingly healthy cells, the addition of yeast-foodstuff commonly used in the yeast industry takes place. Though experience shows that the dead, degenerated and weaker cells will be destroyed, not at 41° F. but in the next higher temperature-zone, it is convenient to kill them at the very beginning of the fermentation, as their presence would only increase the number of degenerate cells. To this end I add to the mashes substances poisonous to microorganisms in suitable quantity, such that the weaker cells will be destroyed while the healthy ones will remain alive. Thus I may add to the mash 0.3 to 1.5 cu. in. of 40% formaldehyde for each 22 gallons of mash (5–25 ccs. per hectolitre). This is also useful from the point of view that this quantity destroys the elements noxious with regard to the yeast.

In one mode of procedure, I separate the yeast after it has fermented the sugar in any given mash and transport it to a fresh mash. But it is also possible to leave the yeast in the mash and then to raise its temperature and add further quantities of sugar.

It is a matter of course that the beer-yeast is not converted into distillery-yeast, but only acquires its properties whereby it becomes fully suitable for baking purposes.

Besides innumerable laboratory tests, this process has been proved in practice several times.

Having now particularly described and ascertained the nature of my said invention, and in what manner the same is to be performed, I declare that what I claim is:

1. A process for making baker-yeast from beer-yeast comprising first using said beer-yeast to ferment a series of dilute mashes free from added nitrogenous yeast nutrients and containing not more than 2% sugar, the first mash being at a temperature of approximately 41° F. and each mash at a higher temperature than the previous one, then when tests show that the mash contains substantially only healthy cells using said yeast to ferment a further series of mashes to which the usual nitrogenous yeast nutrients are added the temperature of said further series increasing from that of the last of said first series to approximately 95° F.

2. A process for making baker-yeast from beer-yeast which consists in using said yeast to ferment a series of dilute mashes containing not more than 2% sugar and no added nitrogenous yeast nutrient, each fermentation being carried out at a temperature higher than the previous one and the series commencing at a temperature of approximately 41° F. and terminating at a temperature of approximately 95° F., the fermentations being effected under aeration and the weak and dead yeast cells being removed.

3. A process as set forth in claim 2 in which 5–25 cubic centimeters of 40% formaldehyde solution are added per hectolitre of mash before fermentation.

4. A process as set forth in claim 2 in which the time of the fermentation effected at temperatures below 66° F. is at least twice that of the fermentation effected at temperatures above 66° F.

5. A process as set forth in claim 2 in which 5–25 cubic centimeters of 40% formaldehyde solution are added per hectolitre of mash before fermentation and the time of fermentation effected at temperatures below 66° F. is at least twice that of the fermentation effected at temperatures above 66° F.

6. A process as set forth in claim 1 in which 5–25 cubic centimeters of 40% formaldehyde solution are added per hectolitre of mash before fermentation.

7. A process as set forth in claim 1 in which the time of the fermentation effected at temperatures below 66° F. is at least twice that of the fermentation effected at temperatures above 66° F.

8. A process as set forth in claim 1 in which 5–25 cubic centimeters of 40% formaldehyde solution are added per hectolitre of mash before fermentation and the time of fermentation effected at temperatures below 66° F. is at least twice that of the fermentation effected at temperatures above 66° F.

EDMUND FUCHS.